(12) United States Patent
Makizono et al.

(10) Patent No.: US 6,530,230 B2
(45) Date of Patent: Mar. 11, 2003

(54) ACCUMULATOR MODULE

(75) Inventors: Kazuya Makizono, Chiryu (JP); Toshio Hirata, Haguri-gun (JP); Yasutaka Kuroda, Anjyo (JP); Yoshiyuki Yamauchi, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/037,214

(22) Filed: Nov. 9, 2001

(65) Prior Publication Data

US 2002/0078702 A1 Jun. 27, 2002

(30) Foreign Application Priority Data

Nov. 9, 2000 (JP) .................................. 2000-342119
Sep. 25, 2001 (JP) .................................. 2001-291358

(51) Int. Cl.[7] .......................... F25B 41/04; F25B 43/00
(52) U.S. Cl. ............................................ 61/217; 62/503
(58) Field of Search ............................ 62/113, 217, 471, 62/503, 513

(56) References Cited

U.S. PATENT DOCUMENTS 4,488,413 A * 12/1984 Bottum ........................ 62/503
4,537,045 A * 8/1985 Mayer ......................... 62/503
5,233,842 A * 8/1993 Manning et al. .............. 62/132
6,032,482 A    3/2000 Krauss

FOREIGN PATENT DOCUMENTS

JP          10-19421         1/1998

* cited by examiner

*Primary Examiner*—Denise L. Esquivel
*Assistant Examiner*—Melvin Jones
(74) *Attorney, Agent, or Firm*—Harness, Dickey & Pierce, PLC

(57) ABSTRACT

When the first pressure reducing device 161 is fixed to the accumulator tank 140 and the internal heat exchanger 150 is housed in the accumulator tank 140, the accumulator, the first pressure reducing device 161 and the internal heat exchanger 150 are integrated into one body. Due to the foregoing, it is possible to eliminate parts for piping to connect the first pressure reducing device 161 with the internal heat exchanger 150. The mass of the vibration system of the first pressure reducing device 161 including the accumulator tank 140 and the internal heat exchanger 150 is increased. Therefore, even if the valve body 413 in the first pressure reducing device is vibrated, it becomes difficult for other portions to vibrate. Accordingly, it is possible to reduce noise (vibration) generated when refrigerant is decompressed by the first pressure reducing device 161.

7 Claims, 10 Drawing Sheets

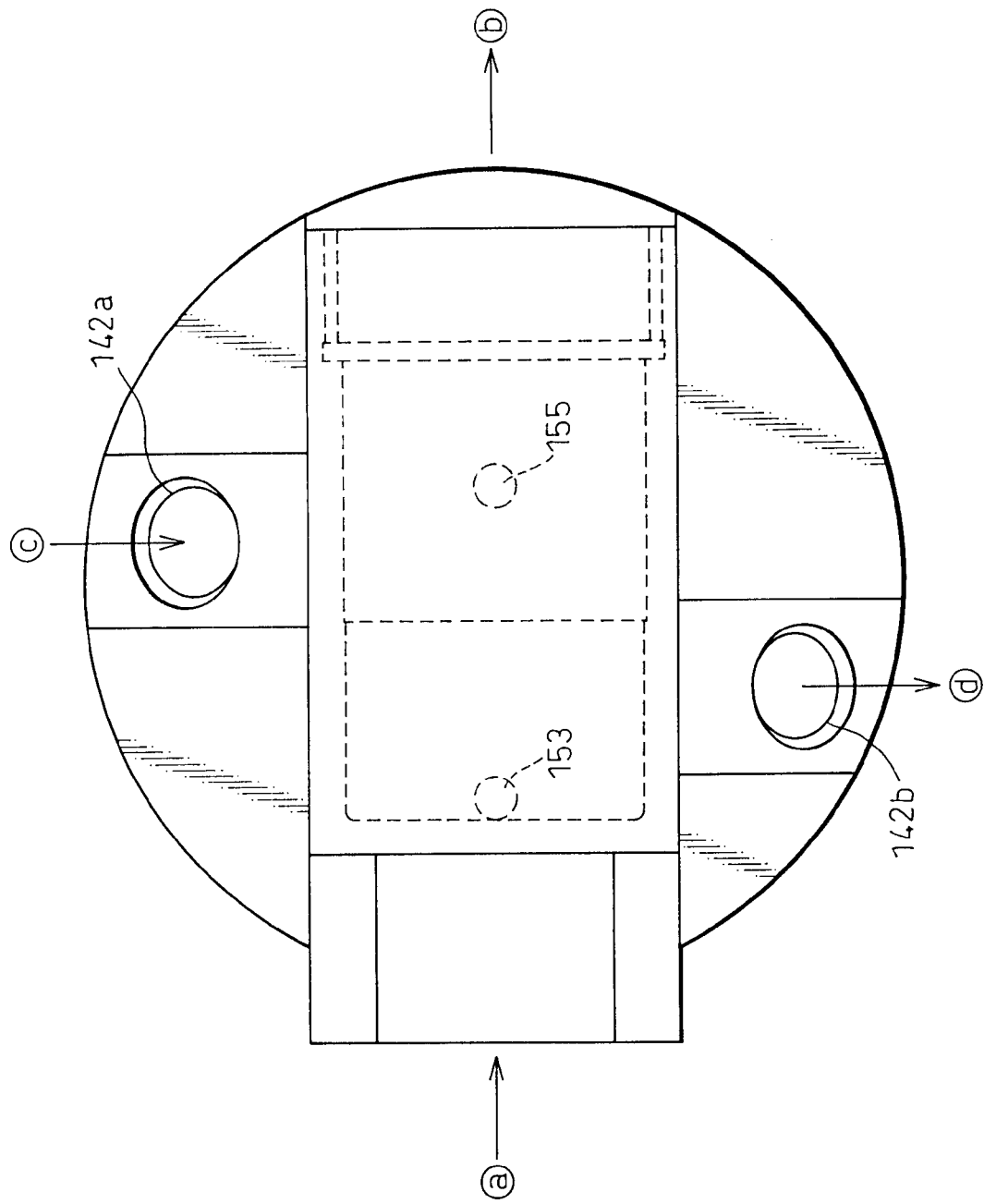

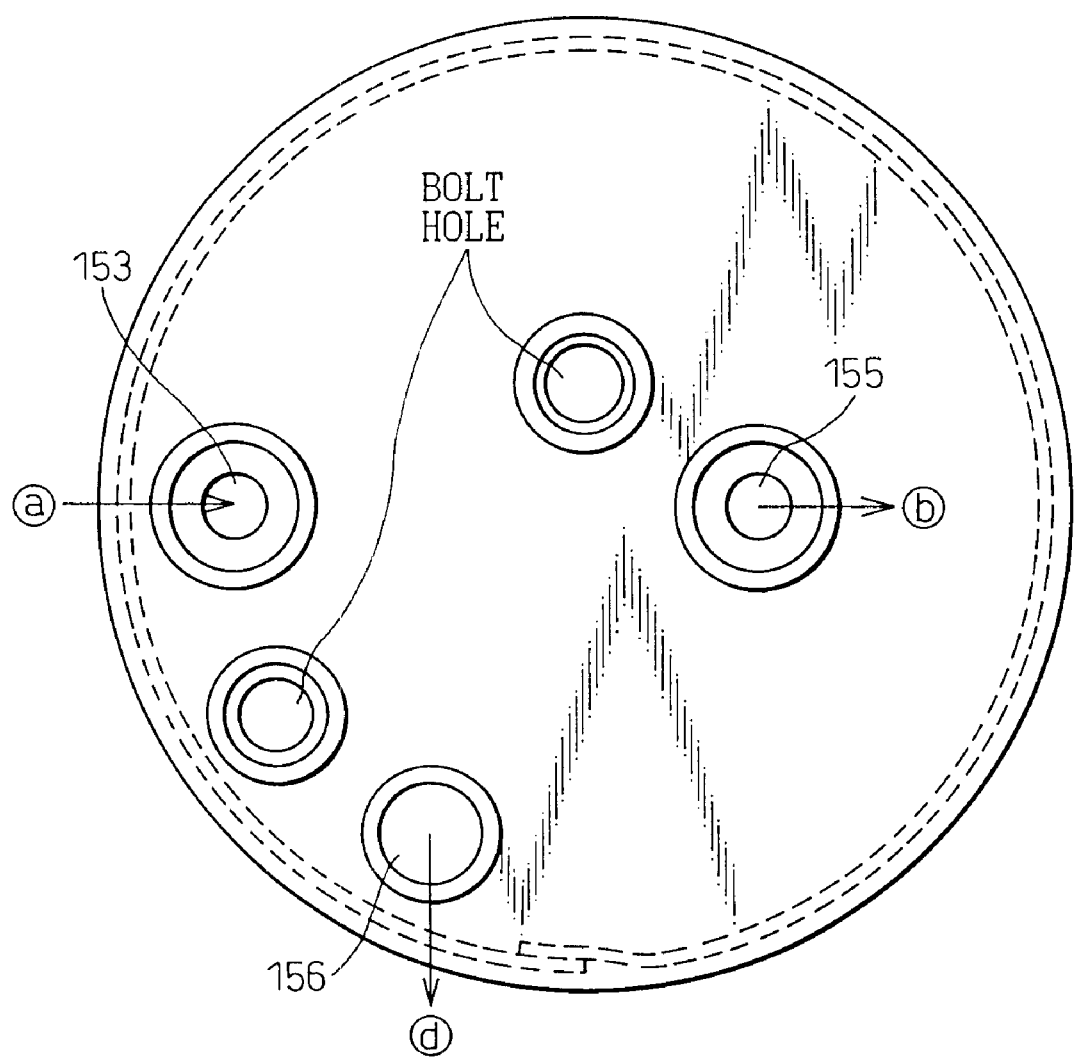

A-A

<IN HEATING OPERATION>

ACCUMULATOR MODULE

BACKGROUND OF THE INVENTION

1. Field of the Invention

The present invention relates to an accumulator applied to a vapour-compression type refrigerating machine. The present invention is effectively used for an ultra-critical pressure type refrigerating machine in which the pressure of refrigerant (discharge pressure of a compressor) on the high pressure side becomes higher than the critical pressure of refrigerant.

2. Description of the Related Art

In a vapour-compression type refrigerating machine, which will be referred to as a refrigerating machine hereinafter, for example, as described in Japanese Unexamined Patent Publication No. 10-19421, when heat is exchanged between refrigerant on the high pressure side, which is cooled, and refrigerant on the low pressure side which is decompressed by a pressure reducing device and sucked into a compressor, it is possible to prevent liquid-phase refrigerant from being sucked into a compressor while the enthalpy of refrigerant flowing into an evaporator (heat exchanger on the low pressure side) is being decreased. Therefore, it is possible to protect the compressor while the efficiency (coefficient of performance) of the refrigerating machine is being enhanced.

In this connection, in the refrigerating machine disclosed in the above patent publication, an internal heat exchanger, which exchanges heat between the refrigerant on the high pressure side and that on the low pressure side, is housed in an accumulator tank so that the number of parts can be reduced. However, it is necessary to provide a refrigerant pipe to connect the pressure reducing device with the internal heat exchanger and also it is necessary to provide parts for piping such as packing and so forth. Further, it is necessary to conduct connection work for connecting these parts for piping. Accordingly, it is difficult to reduce the manufacturing cost of the refrigerating machine.

SUMMARY OF THE INVENTION

In view of the above problems, the present invention has been accomplished. It is an object of the present invention to provide an accumulator capable of reducing the number of parts of a refrigerating machine.

In order to accomplish the above object, an accumulator module of the present invention comprises: an accumulator tank (140) for separating refrigerant into gas-phase refrigerant and liquid-phase refrigerant and storing redundant refrigerant therein, the thus separated gas-phase refrigerant flowing out from the accumulator tank (140) onto the suction side of the compressor (110); a pressure reducing device (161a) for decompressing refrigerant on the high pressure side which is compressed by the compressor (110) and cooled after that; and an internal heat exchanger (150) for conducting heat exchange on the refrigerant on the low pressure side which is decompressed by the pressure reducing device (161a), before it is sucked into the compressor (110), wherein the pressure reducing device (161a) is fixed to the accumulator tank (140), and the internal heat exchanger (150) is housed in the accumulator tank (140).

Due to the foregoing, it is possible to eliminate parts of piping to connect the pressure reducing device (161a) with the internal heat exchanger (150). Therefore, it is possible to reduce the number of parts of a vapour-compression type refrigerating machine. As a result, it is possible to reduce the time necessary for assembling the refrigerating machine.

In this connection, when the refrigerant is decompressed by the pressure reducing device (161a), a valve body provided in the pressure reducing device (161a) tends to vibrate. Therefore, noise (vibration) tends to be generated. However, according to the present invention, the accumulator tank (140), the first pressure reducing device (161a) and the internal heat exchanger (150) are integrated into one body. Accordingly, the mass of the vibration system of the pressure reducing device (161a) including the accumulator tank (140) and the internal heat exchanger (150) is increased. Therefore, even when the valve body is vibrated, it is difficult for other portions to vibrate. For the above reasons, it becomes possible to reduce the occurrence of noise (vibration) generated when the refrigerant is decompressed by the pressure reducing device (161a).

In this connection, reference numerals in the parentheses in the above means correspond to the specific means of the embodiment described later.

The present invention may be more fully understood from the description of preferred embodiments of the invention, as set forth below, together with the accompanying drawings.

BRIEF DESCRIPTION OF THE DRAWINGS

In the drawings:

FIG. 3B is an upper view of the control system of the air conditioner shown in FIG. 3A;

FIG. 4B is an upper view of the accumulator module shown in FIG. 4A;

DESCRIPTION OF THE PREFERRED EMBODIMENTS

First Embodiment

Figure 1:
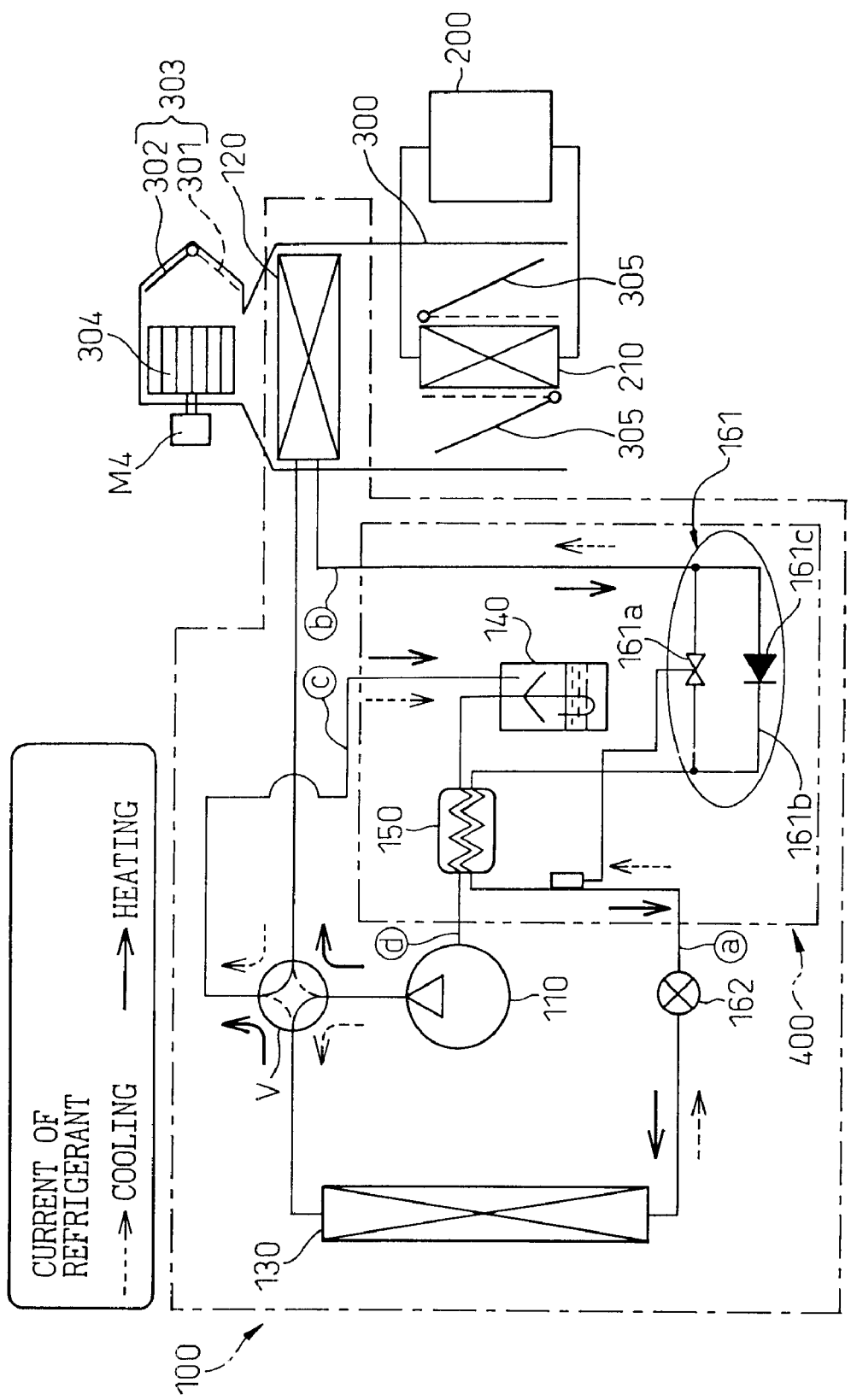
FIG. 1 is a schematic illustration of an air conditioner of an embodiment of the present invention.

In this embodiment, an accumulator module of the present invention is applied to an air conditioner (heat pump type refrigerating machine), the refrigerant of which is carbon dioxide and which is used for an electric car, capable of changing over between cooling and heating. FIG. 1 is a schematic illustration of the air conditioner (heat pump type refrigerating machine) of this embodiment.

In this connection, devices surrounded by one-dotted chain lines in FIG. 1 compose a heat pump type refrigerating machine 100 which will be referred to as a heat pump hereinafter. Reference numeral 200 is a fuel cell to generate electric power by the chemical reaction between oxygen and hydrogen, and this fuel cell supplies electric power to an electric motor (not shown) to drive a car. In this embodiment, the fuel cell 200 is a high polymer electrolyte type fuel cell.

Reference numeral 110 is an electric compressor of an inverter control type, which will be referred to as a compressor hereinafter, to suck and compress refrigerant.

Reference numeral 120 is a first heat exchanger for exchanging heat between air flowing out into the indoor and the refrigerant. Reference numeral 130 is a second heat exchanger for exchanging heat between outside air and the refrigerant.

Reference mark V is a selector valve for selecting the refrigerant, which has been discharged from the compressor 110, between a case in which the refrigerant is circulated to the first heat exchanger 120 and a case in which the refrigerant is circulated to the second heat exchanger 130. Reference numeral 140 is an accumulator tank (gas-liquid separation tank) for separating the refrigerant between the gas-phase refrigerant and the liquid-phase refrigerant, and the thus separated gas-phase refrigerant is made to flow out onto the suction side of the compressor 110, and at the same time the accumulator tank 140 stores the redundant refrigerant which cannot be accommodated in the heat pump.

In this connection, the accumulator tank 140 is integrated, with the first pressure reducing device 161 and the internal heat exchanger 150, into one body. Thus integrated devices, which are surrounded by two-dotted chain lines in the drawing are referred to as an accumulator module 400 hereinafter, will be described in detail later.

Reference numeral 150 is an internal heat exchanger for exchanging heat between the refrigerant, which has been compressed by the compressor 110 and cooled by the first heat exchanger 120 or the second heat exchanger 130 (This refrigerant will be referred to as high pressure side refrigerant "a", "b" hereinafter.), and the refrigerant which has been made to flowed out from the accumulator tank 140 and sucked into the compressor 110 (This refrigerant will be referred to as low pressure side refrigerant "c", "d" hereinafter.).

Reference numeral 161 is a first pressure reducing device (pressure reducing device for cooling) which is arranged in a refrigerant passage connecting the internal heat exchanger 150 with the first heat exchanger 120 and decompresses the refrigerant "a" flowing out from the second heat exchanger 130 in the case of cooling operation in which cold air is blown out into the indoor.

This first pressure reducing device 161 includes: a mechanical type expansion valve (pressure reducing device) 161a for controlling refrigerant pressure on the outlet side of the second heat exchanger 130 according to the refrigerant temperature on the outlet side of the second heat exchanger 130; a bypass circuit 161b for circulating the refrigerant by bypassing the expansion valve 161a; and a check valve 161c for only allowing the refrigerant to circulate from the first heat exchanger 120 toward the internal heat exchanger 150.

Reference numeral 162 is a second pressure reducing device (pressure reducing device for heating) of an electric type which is arranged in a refrigerant passage connecting the second heat exchanger 130 with the internal heat exchanger 150 and decompresses the refrigerant "b" flowing out from the first heat exchanger 120 in the case of heating operation in which hot air is blown out into the indoor. The degree of opening of these pressure reducing devices (pressure reducing valves) 161, 162 is controlled by an electronic control unit described later.

Reference numeral 300 is an air conditioner casing composing a passage of air blowing out into the indoor. On the upstream side of an air current in this air conditioner casing 300, there are provided an indoor air introducing port 301 and an outdoor air introducing port 302.

Both the air introducing ports 301, 302 are opened and closed and changed-over by the indoor and outdoor air selecting door 303. Reference numeral 304 is a centrifugal blower for blowing air into the indoor.

On the downstream side of an air current in the air conditioner casing 300 with respect to the blower 304, there is provided a first heat exchanger 120 of the heat pump 100. On the downstream side of an air current with respect to the first heat exchanger 120, there is provided a heater core 210 to heat air by the cooling water (fluid) which has recovered waste heat generated in the fuel cell stack 200.

Reference numeral 305 is an air mixing door for adjusting the temperature of air, which blows out into the indoor, by adjusting a ratio (a mixing ratio of warm air to hot air) of an amount of air (warm air heated by cooling water) passing through the heater core 210 to an amount of air (cold air) bypassing the heater core 210 and circulating onto the downstream side.

In this connection, on the downstream side of an air current of the air mixing door 305 (heater core 210), there are provided a face opening section (not shown) for blowing out air-conditioned air to upper bodies of passengers, a foot opening section (not shown) for blowing out air-conditioned air to feet of the passengers, and a defroster opening section (not shown) for blowing out air-conditioned air to the inner face of a windshield. In the upstream portion of an air current of each opening section, there is provided a blowing mode selecting door (not shown) which opens and closes each opening section.

Figure 2:
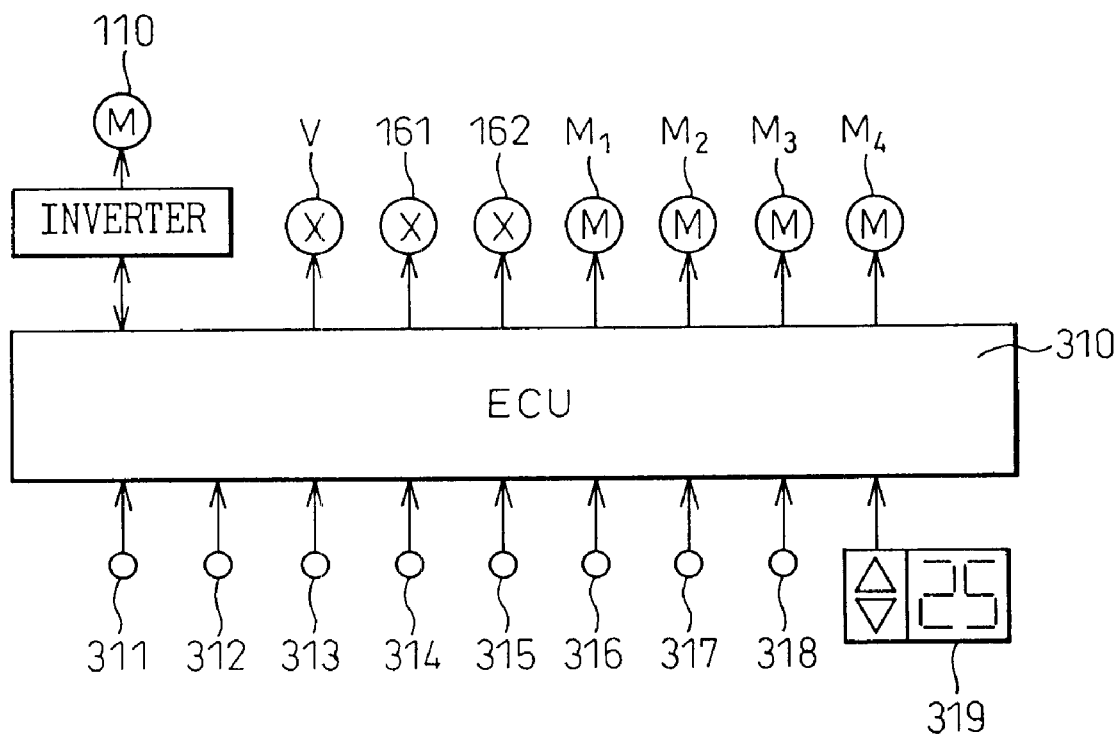
FIG. 2 is a schematic illustration of a control system of an air conditioner of an embodiment of the present invention.

The blowing mode selecting door, the air mixing door 305 and the inside and outside air selecting door 303 are driven by servo motors (drive means) M1 to M3. These servo motors M1 to M3 and the electric motor M4 of the blower 304 are controlled by the electronic control unit (ECU) 310 as shown in FIG. 2.

ECU 310 is inputted with signals sent from the following sensors. They are a first pressure sensor (first pressure detection means) 311 for detecting the pressure of the refrigerant flowing out from the second heat exchanger 130, a first temperature sensor (first refrigerant temperature detection means) 312 for detecting the temperature of the refrigerant flowing out from the second heat exchanger 130, a second pressure sensor (second pressure detection means) 313 for detecting the pressure of the refrigerant flowing out from the first heat exchanger 120, a second temperature sensor (second refrigerant temperature detection means) 314 for detecting the temperature of the refrigerant flowing out from the first heat exchanger 120, an outside air temperature sensor (outside air temperature detection means) 315 for detecting the temperature of outside air, an after-first heat exchanger temperature sensor (first heat exchanger temperature detection means) 316 for detecting the temperature (temperature of the first heat exchanger 120) of the air immediately after air has passed through the first heat exchanger 120, an inside air temperature sensor (inside air detection means) 317 for detecting the temperature of indoor air, and a solar radiation sensor (solar radiation amount detection means) 318 for detecting an amount of solar radiation given into the indoor. Further, ECU 310 is inputted with a setting value which has been set on the temperature control panel 319 on which a passenger sets a desired temperature.

According to a predetermined program, ECU 310 controls the blowing mode selecting door (M1), the air mixing door 305 (M2), the inside and outside air selecting door 303 (M3), the blower 304 (M4), the pressure reducing devices 161, 162, the selector valve V and the compressor 110 on the basis of the detection values of the sensors 311 to 318 and the setting temperature Tset which has been set on the temperature control panel.

Next, the accumulator module 400 will be explained below.

Figure 3A:
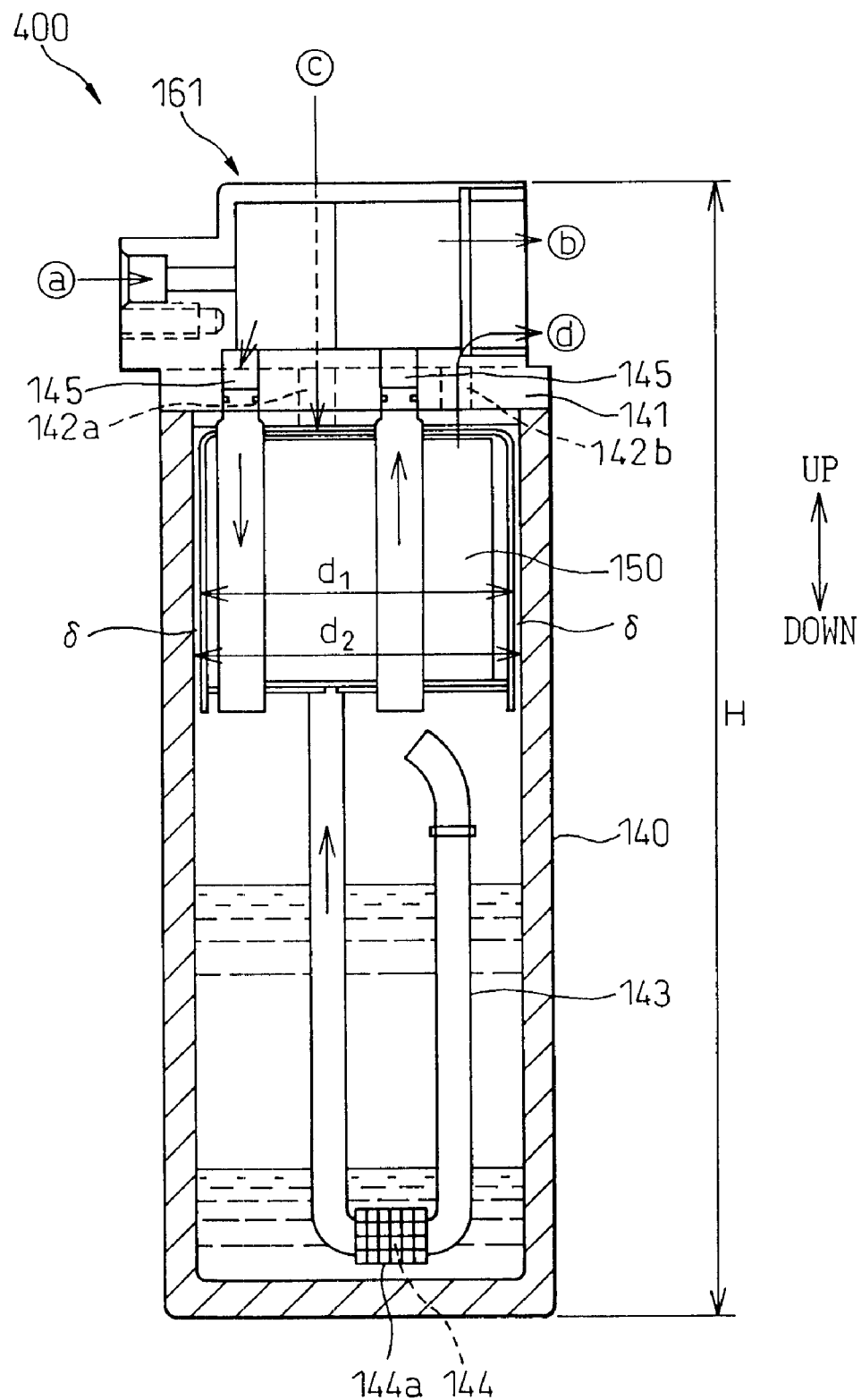
FIG. 3A is a schematic illustration of a control system of an air conditioner of an embodiment of the present invention.

FIG. 3A is a cross-sectional schematic illustration of the accumulator module 400. The first pressure reducing device 161 is fixed onto an upper end side of the accumulator tank 140 made of metal, which will be referred to as a tank 140 hereinafter, which is substantially formed into a cylinder. Therefore, the tank 140 and the first pressure reducing device 161 are integrated with each other into one body.

An opening section of the tank 140 is closed by the tank cover 141 which is welded to the tank 140. On this tank cover 141, there are provided a refrigerant inlet 142a to introduce refrigerant, which has been sucked and evaporated by the first heat exchanger 120 or the second heat exchanger 130, into the tank 140, a refrigerant outlet 142b to flow out the refrigerant, which flows out from the internal heat exchanger 150, to the suction side of the compressor 110 (see FIG. 3A), and a refrigerant discharge tube 143 which is formed into a substantial J-shape in which the refrigerant discharge tube 143 is bent in such a manner that the bent portion protrudes downward.

In this case, one end of the refrigerant discharge tube 143 is open to a portion which is higher than the refrigerant level of the liquid-phase refrigerant in the tank 140 and lower than the refrigerant inlet 142a. Due to the foregoing, the gas-phase refrigerant is introduced into the refrigerant discharge tube 143 and made to flow out to the suction side of the compressor 110.

In this connection, the refrigerant flowing from the refrigerant inlet 142a into the tank 140 is not always gas-phase refrigerant (vapor-refrigerant). When a heat load given to the air conditioner is light, a two phase refrigerant containing gas and liquid flows into the tank 140. In this case, when cooling operation is conducted, the heat load given to the air conditioner means a cooling capacity (refrigerating capacity) required for the first heat exchanger 120. When heating operation is conducted, the heat load given to the air conditioner means a heat absorbing capacity (refrigerating capacity) required for the second heat exchanger 130.

At a lower end portion of the refrigerant discharge tube 143, there is provided an oil return hole (lubricant suction hole) 144 for sucking lubricant (This lubricant is oil, the principal component of which is PAG (polyalkylene glycol)) staying on the lower side of the liquid-phase refrigerant. Lubricant which has been separated by, and stored in, the accumulator 140 is sucked into the compressor 100 together with the gas-phase refrigerant circulating in the refrigerant discharge tube 143. In this connection, in the oil return hole 144, there is provided a filter (metallic mesh) for preventing foreign matter from being sucked into the refrigerant discharge tube 143.

In this connection, from an actual viewpoint, the lubricant and the liquid-phase refrigerant are not perfectly separated from each other, which is unlike the state shown in FIG. 3A. Accordingly, the lubricant, which is mentioned here, does not mean pure lubricant but the liquid-phase refrigerant containing a large quantity of the lubricant.

Figure 4A:
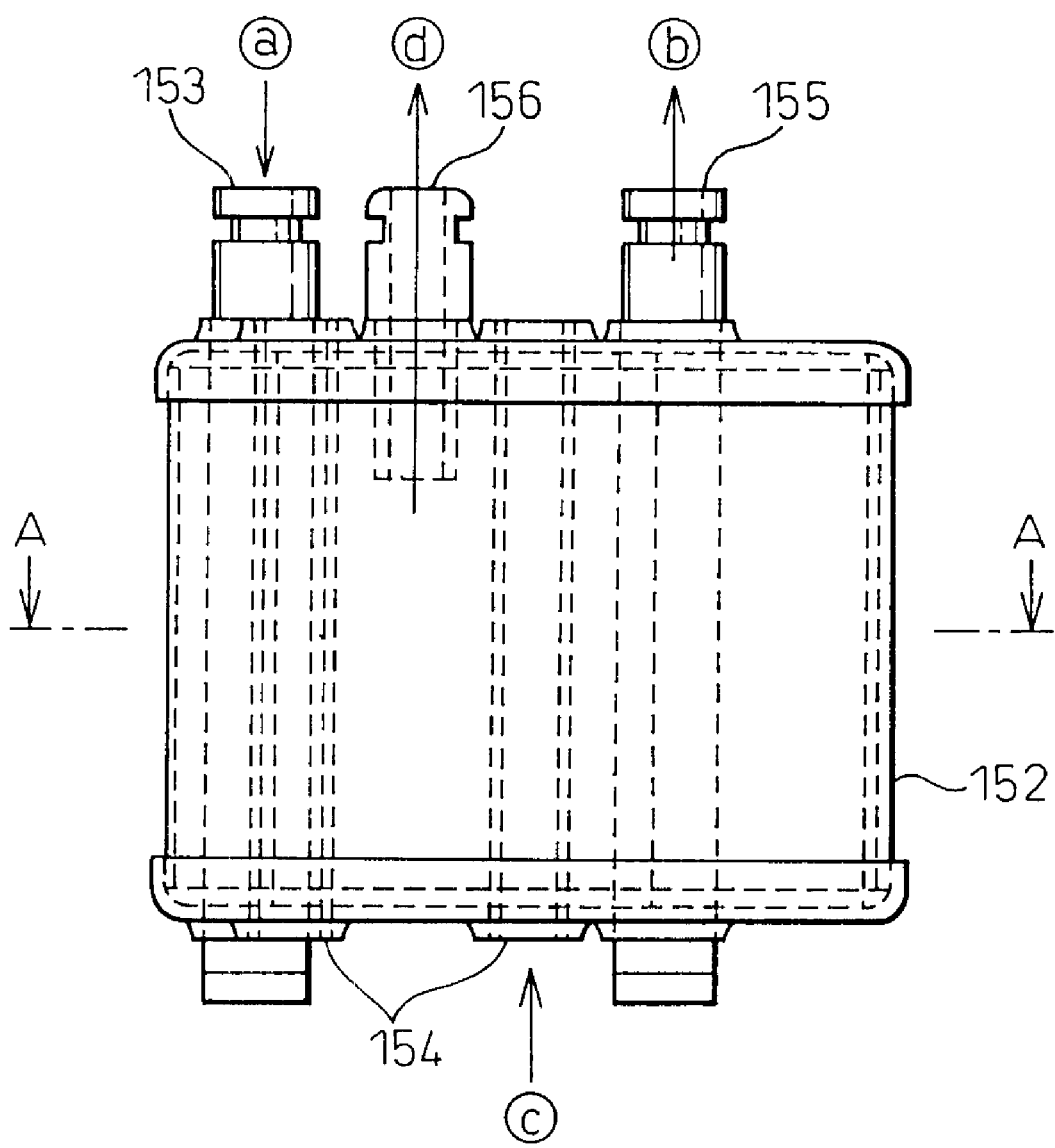
FIG. 4A is a cross-sectional schematic illustration of an accumulator module relating to the first embodiment of the present invention.
Figure 5:
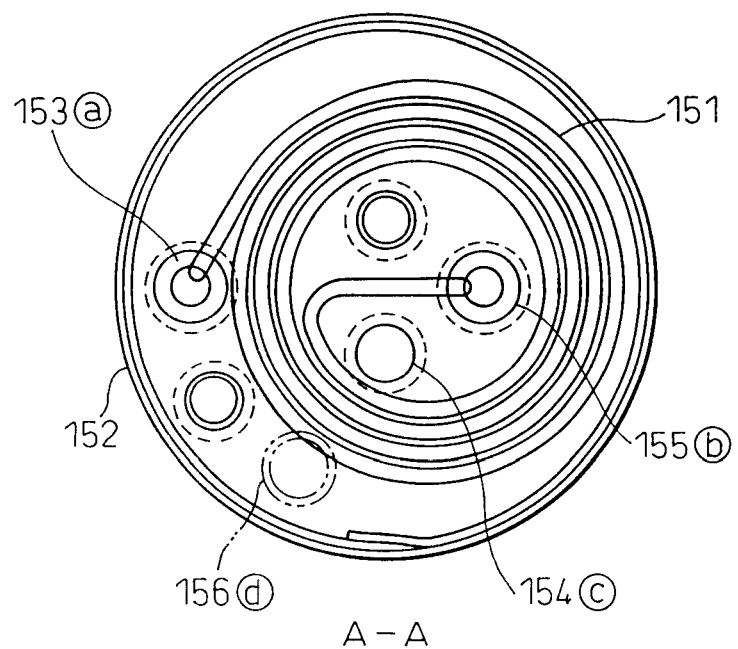
FIG. 5 is a view showing the appearance of an internal heat exchanger housed in the accumulator module of the first embodiment of the present invention.

As shown in FIGS. 4A and 5, the internal heat exchanger 150 includes: a cylindrical casing 152 which houses a spiral flat tube 151 in which the refrigerant on the discharge side is circulated; and opening sections 153 to 156, which are formed on the casing 152, into which the refrigerant flows.

In this connection, in FIGS. 3B, 4A, 4B and 5, the opening section 153, which is an inlet of the refrigerant on the high pressure side, is provided for supplying the refrigerant on the discharge side to the flat tube 151 which will be referred to as a tube hereinafter. The opening section 155, which is an outlet of the refrigerant on the high pressure side, is provided for discharging refrigerant onto the discharge side, which has completed heat exchange, to the suction side of the compressor 110. The opening section 154, which is an inlet of the refrigerant on the low pressure side, is provided for supplying (charging) the refrigerant on the suction side into the casing 152. The opening section 156, which is an outlet of the refrigerant on the low pressure side, is provided for discharging the refrigerant on the suction side, which has completed heat exchange, to the outside of the casing 125.

Figure 6:
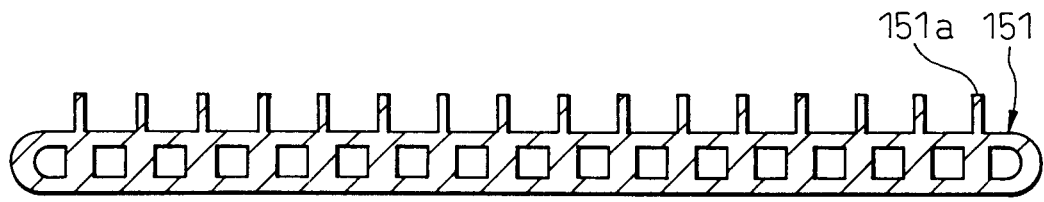
FIG. 6 is a cross-sectional view of a tube applied to the internal heat exchanger housed in the accumulator module of the first embodiment of the present invention.

In this case, as shown in FIG. 6, on the flat face of the tube 151, there are provided a plurality of protrusions 151a which protrude all over the longitudinal regions. These protrusions 151a are formed by means of extrusion or drawing integrally with the tube 151. When end portions of these protrusions 151a come into contact with the flat face of the adjoining tube 151, it is possible to form passages between the flat faces adjacent to each other in which the refrigerant flows.

Accordingly, the refrigerant which flows from the refrigerant inlet 142a into the tank 140, as shown in FIG. 3A, reaches to the lower side of the tank 140 flowing around the internal heat exchanger 150. The gas-phase refrigerant which flows through the refrigerant discharge tube 143 to the casing 152 exchanges heat with the high-pressure refrigerant flowing in the tube 151 and flows out from the refrigerant outlet 142b to the suction side of the compressor 110.

Figure 7:
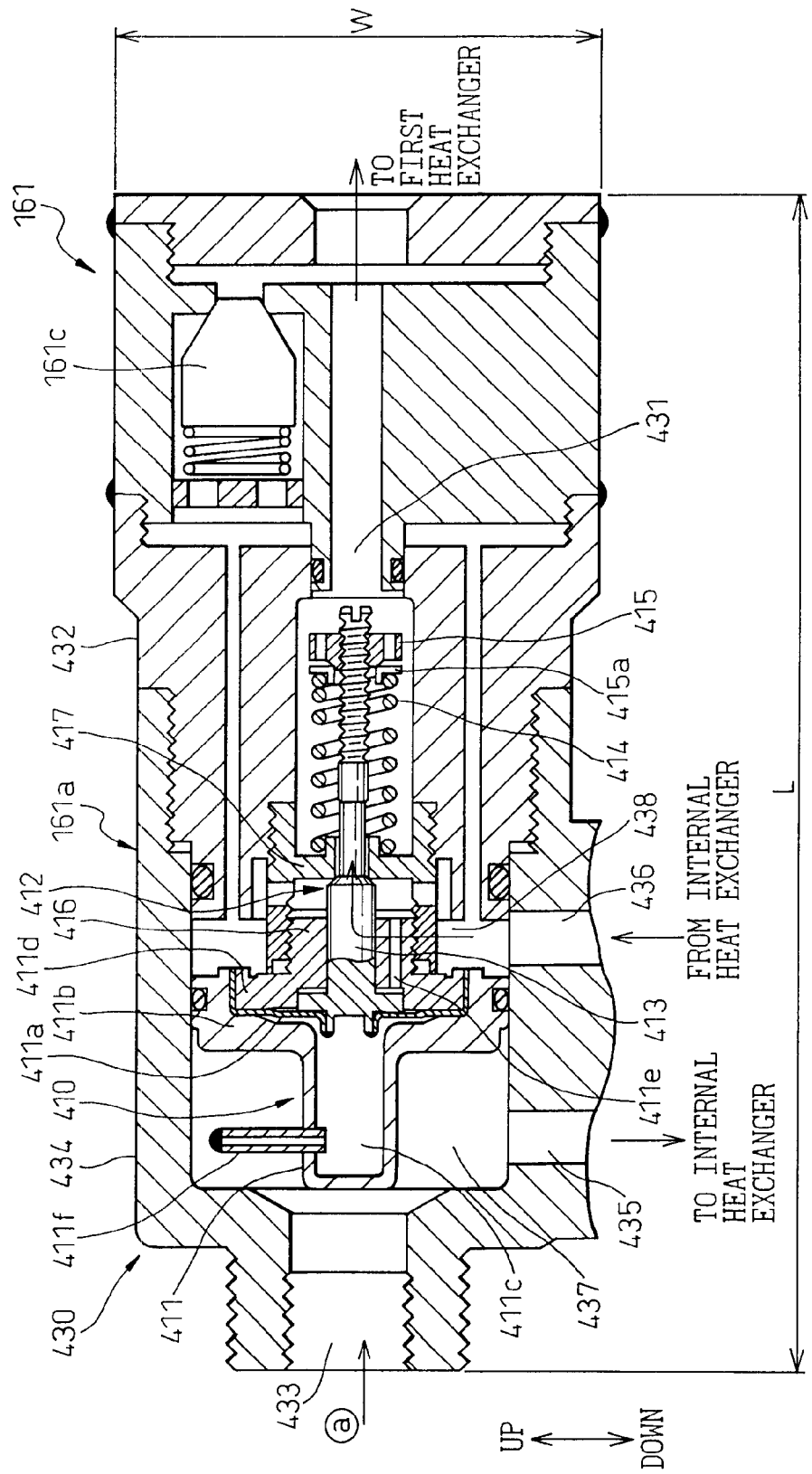
FIG. 7 is a cross-sectional schematic illustration of a valve module relating to the first embodiment of the present invention in the case of a cooling operation.

FIG. 7 is a cross-sectional view showing the first pressure reducing device 161. The first pressure reducing device 161 will be explained as follows.

Reference numeral 410 is a control valve body (element) which has a temperature detecting section 411, the inside pressure of which changes according to the refrigerant temperature on the high pressure side (In this example, the refrigerant temperature on the high pressure side is a refrigerant temperature on the discharge side of the second heat exchanger 130.), and adjusts the degree of opening of the valve port 412 of the pressure control valve 400 according to the variation of the inside pressure of the temperature detecting section 411. Reference numeral 430 is a casing in which the control valve body 410 is housed.

In this connection, the casing 430 includes: a casing body 432, to which the control valve body 410 is fixed, in which the valve port (inlet of the refrigerant on the high pressure side and outlet of the refrigerant on the low pressure side) 431 connected with the entrance of the heat exchanger (in this example, the first heat exchanger 120) is formed; and a cover 434, which closes an opening section for assembling the control valve body 410 to the casing body 432, in which the valve port (inlet of the refrigerant on the high pressure side and outlet of the refrigerant on the low pressure side) 433 connected with the exit of the heat exchanger (in this example, the second heat exchanger 130) on the high pressure side is formed.

In the casing 430 (casing body 432), there are provided internal heat exchanger side refrigerant ports 435, 436 (referred to as ports hereinafter) which are communicated with the internal heat exchanger 150. The ports 435 is communicated with the valve port 433 (on the temperature detecting section 411 side), and the port 436 is communicated with the upstream side of the refrigerant of the valve port 412 of the control valve body 410.

In this case, the casing 430 is integrated with the tank cover 141 into one body. The ports 435, 436 are open toward the inside of the tank 140 while the ports 435, 436 are communicated with the internal heat exchanger 150 via the refrigerant passage 144 formed on the tank cover 141. On the other hand, the valve ports 431, 433 are open in the direction (horizontal direction) substantially perpendicular to the longitudinal direction of the tank 140.

The refrigerant passage formed from the valve port 433 to the port 435 is referred to as a first refrigerant passage (temperature detecting chamber) 437, and the refrigerant passage formed from the port 436 to the valve opening 412 is referred to as a second refrigerant passage 438.

In this connection, the temperature detecting section 411 of the control valve body 410 is located in the first refrigerant passage 437 and detects a refrigerant temperature on the discharge side of the second heat exchanger 130. This temperature detecting section 411 includes: a thin-film-shaped diaphragm (pressure responding member) 411a; a diaphragm cover 411b forming a tightly closed space (control chamber) 411c together with the diaphragm 411a; and a diaphragm support 411d fixing the diaphragm 411a together with the diaphragm cover 411b in such a manner that the diaphragm 411a is interposed between the diaphragm support 411d and the diaphragm cover 411b.

In this connection, the refrigerant is charged in the tightly closed space 411c at a density (625 kg/m$^3$ in this embodiment) in the range from the saturated liquid density at 0° C. to the saturated liquid density at the critical point of refrigerant. Onto the opposite side to the tightly closed space 411c with respect to the diaphragm 411a, the pressure in the second refrigerant passage 438 is introduced via the pressure introducing passage 411e.

Reference numeral 411f is a sealing tube for sealing the refrigerant in the temperature detecting section 411 (closed space 411c). This sealing tube 411f is made of metal such as copper, the heat conductivity of which is high, so that the refrigerant temperature in the tightly closed space 411c can follow the refrigerant temperature in the first refrigerant passage 437 without a time lag.

Reference numeral 413 is a needle valve body, which will be referred to as a valve body hereinafter, for adjusting the degree of opening of the valve port 412. This valve body 413 is fixed to the diaphragm 411a and the degree of opening of the valve port 412 is reduced because the valve body 413 is mechanically linked with an increase in the inner pressure of the tightly closed space 411c.

Reference numeral 414 is a spring (elastic body) for giving an elastic force to the valve body 413 in the direction so that the degree of opening of the valve port 412 can be reduced. The valve body 413 is moved according to the balance between the elastic force of the spring 414 and the force caused by a pressure difference between the inside and the outside of the tightly closed space 411c. The elastic force of the spring 414 is referred to as a valve closing force hereinafter, and the force caused by the pressure difference is referred to as a valve opening force hereinafter.

In this case, the initial setting load of the spring 414 is adjusted by turning the adjustment nut 415, and the initial setting load (elastic force under the condition that the valve port 412 is closed) is set at a value so that the refrigerant has a predetermined super cooling degree (about 10° C. in this embodiment) in the condensation region lower than the critical pressure of the refrigerant. Specifically, the initial setting load is about 1 [MPa] when it is converted to pressure in the tightly closed space 411c. In this connection, reference numeral 415a is a spring washer for preventing the spring 414 from directly rubbing the adjustment nut 415 when the adjustment nut 415 is turned.

Due to the above structure, in the super critical region, the expansion valve 161a controls the refrigerant pressure on the exit side of the second heat exchanger 130 according to the refrigerant temperature on the exit side of the second heat exchanger 130 along the isopycnic line of 625 kg/m$^3$. In the condensation region, the expansion valve 161a controls the refrigerant pressure on the exit side of the second heat exchanger 130 so that the degree of super cooling of refrigerant on the exit side of the second heat exchanger 130 can be a predetermined value. At this time, in the super critical region, the high pressure control line η and the isopycnic line of 625 kg/m$^3$ substantially agree with each other. Therefore, control is conducted so that the refrigerant pressure on the exit side of the second heat exchanger 130 can agree with the high pressure control line η.

In this connection, the high pressure control line η shows a relation between the refrigerant temperature (In this example, the refrigerant temperature is a temperature of refrigerant on the exit side of the second heat exchanger 130.) on the high pressure side at which COP (coefficient of performance) of the cycle becomes maximum and the refrigerant pressure (In this example, the refrigerant pressure is pressure of refrigerant on the exit side of the second heat exchanger 130.) on the high pressure side. Usually, the high pressure control line η in the case of a cooling operation, and the high pressure control line η in the case of a heating operation, are different from each other.

In this connection, the valve seat body 417 of the control valve body 410 and the valve holder 416 described later compose a bulkhead section which separates the first refrigerant passage 437 and the second refrigerant passage 438 from each other and prevents the refrigerant on the second refrigerant passage 438 side from being heated by the refrigerant on the first refrigerant passage 437 side.

In this connection, the valve body 413 penetrates the valve body holder 416 to guide a sliding motion of the valve body 413 and extends from the first refrigerant passage 437 side to the second refrigerant passage 438 (valve port 412) side. Therefore, it is necessary to determine clearance (pressure loss), which is formed between the valve body 413 and the valve body holder 416, to be a value so that a large quantity of the refrigerant can not circulate to the second refrigerant passage 438 via the first refrigerant passage 437.

In this connection, in FIG. 7, there is shown a flow of the refrigerant in the case of a cooling operation. The refrigerant flows from the valve port 433 into the first pressure reducing device 161 (accumulator module 400), circulates around the heat detecting section 411, passes through the internal heat exchanger 150 (tube 151) and reaches the valve section 412. Then, the refrigerant is decompressed by the valve section 412. After that, the refrigerant flows outside the first pressure reducing device 161 from the valve port 431.

Figure 8:
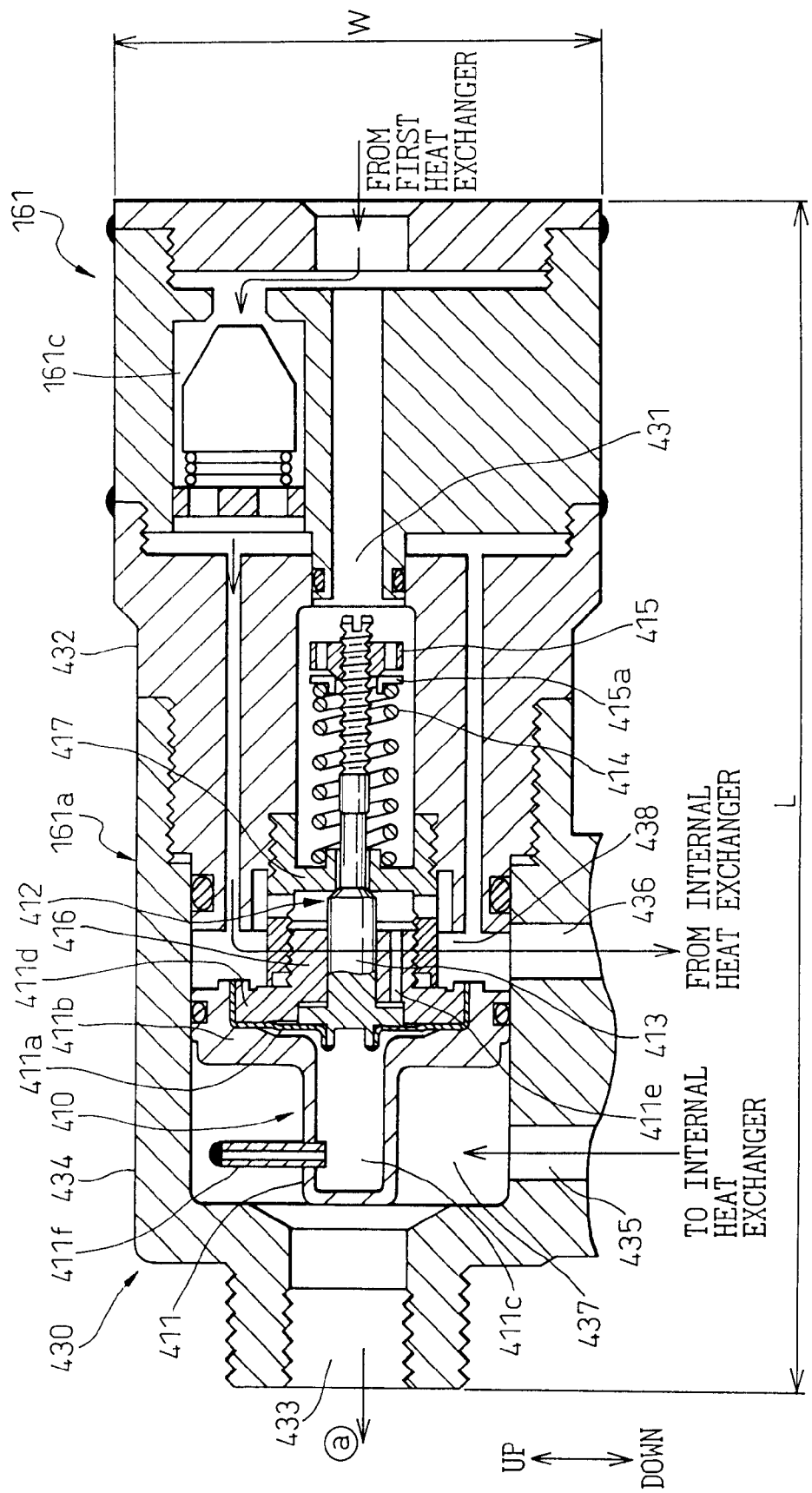
FIG. 8 is a cross-sectional schematic illustration of the valve module relating to the first embodiment of the present invention in the case of a heating operation.

In FIG. 8, there is shown a flow of the refrigerant in the case of a heating operation. The refrigerant flows from the valve port 431 into the first pressure reducing device 161 (accumulator module 400). Then, the refrigerant flows outside the first pressure reducing device 161 from the valve port 431 via the internal heat exchanger 150.

Next, the characteristic of this embodiment will be described.

According to this embodiment, the first pressure reducing device 161 is fixed to the tank 140, and further the internal heat exchanger 150 is housed in the tank 140, and the tank 140, the first pressure reducing device 161 and the internal heat exchanger 150 are integrated into one body. Therefore, it is possible to eliminate parts of piping to connect the first pressure reducing device (161) with the internal heat exchanger (150).

Therefore, it is possible to reduce the number of parts of an air conditioner (heat pump type refrigerating machine). As a result, it is possible to reduce the time necessary for assembling the air conditioner. Accordingly, it is possible to enhance the efficiency of mounting the air conditioner on a vehicle while the manufacturing cost of the air conditioner (heat pump type refrigerating machine) is being reduced.

In this connection, when the refrigerant is decompressed by the first pressure reducing device 161 (expansion valve 161a), the valve body 413 is vibrated and noise (vibration) tends to occur. However, since the tank 140, the first pressure reducing device 161 and the internal heat exchanger 150 are integrated into one body in this embodiment, the mass of the vibration system of the first pressure reducing device 161 (expansion valve 161a) including the tank 140 and the internal heat exchanger 150 is increased. Therefore, even if the valve body 413 is vibrated, it is difficult for other portions to be vibrated. Accordingly, noise (vibration) generated when the refrigerant is decompressed by the first pressure reducing device 161 (expansion valve 161a) can be reduced.

Since the ports 435, 436 are communicated with the internal heat exchanger 150 via the refrigerant passage 145 formed on the tank cover 141, it is possible to eliminate the refrigerant piping to connect the first pressure reducing device 161 with the internal heat exchanger 150. Accordingly, it is possible to further reduce the number of parts of the air conditioner (heat pump type refrigerating machine) and also it is possible to reduce time necessary for assembling the air conditioner.

In this connection, the first pressure reducing device 161 (expansion valve 161a) includes a valve body 412 which makes reciprocating motions. Therefore, as shown in FIGS. 7 and 8, size L of a portion of the first pressure reducing device 161 (expansion valve 161a), which is substantially parallel with the longitudinal direction of the valve body 412, is larger than size W (shown in FIG. 7) of a portion of the first pressure reducing device 161 (expansion valve 161a), which is substantially perpendicular to the longitudinal direction of the valve body 412.

On the other hand, when the valve ports 431, 433 are provided at the end portion of the first pressure reducing device 161 (expansion valve 161a) in the direction of size L, it is possible to make a current of the refrigerant straight in the first pressure reducing device 161 (expansion valve 161a) when a macroscopic view is taken. Therefore, it is possible to make the current of the refrigerant smooth.

Accordingly, as shown in this embodiment, when the valve ports 431, 433 are made to open in a direction (horizontal direction) substantially perpendicular to the longitudinal direction of the tank 140, it becomes possible to prevent the size H (shown in FIG. 3A) of the accumulator module 400, in the direction of height, from increasing.

In this connection, the refrigerant introduced into the tank 140 from the refrigerant inlet 142a circulates in clearance δ (shown in FIG. 3) between the outer wall of the internal heat exchanger 150 and the inner wall of the tank 140 and reaches the lower side of the tank 140. In this case, when clearance δ is too small, the pressure loss in the tank 140 is increased, and the efficiency of the air conditioner (heat pump type refrigerating machine) is lowered. On the other hand, when clearance δ is increased, the capacity of the internal heat exchanger 150 is reduced, and the efficiency (coefficient of performance) of the air conditioner (heat pump type refrigerating machine) is lowered.

Accordingly, in this embodiment, the total sum of the cross section of clearance δ is increased to be larger than the area of the opening of the refrigerant inlet 142a so as to prevent clearance δ from decreasing excessively, and the capacity of the internal heat exchanger 150 is increased to as large as possible.

In this connection, the equivalent size d1 of the outer diameter of the internal heat exchanger 150 is an outer diameter of a circle when the cross section of the internal heat exchanger 150 is converted to the circle, and the equivalent size d2 of the inner diameter of the tank 140 is an inner diameter of a circle when the cross section of the tank 140 is converted to the circle. In this connection, cross sections of both the internal heat exchanger 150 and the tank 140 are circular in this embodiment. Therefore, the outer diameter of the internal heat exchanger 150 is the same as the equivalent size d1 of the outer diameter, and the inner diameter of the tank 140 is the same as the equivalent size d2 of the inner diameter.

Second Embodiment

Figure 9:
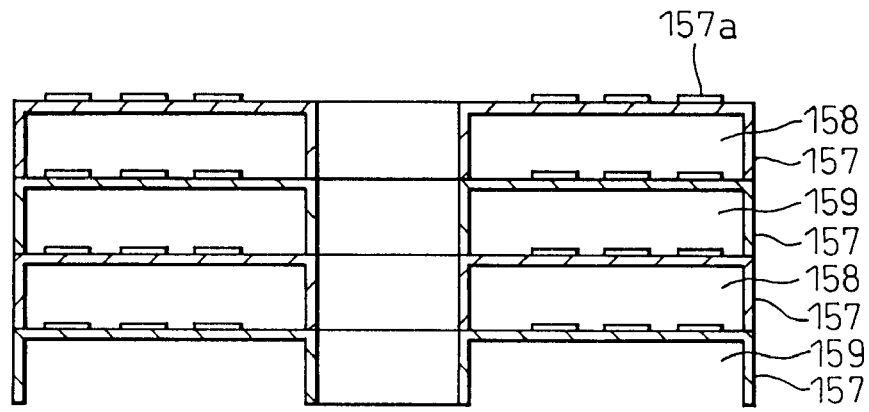
FIG. 9 is a cross-sectional view of an internal heat exchanger used for the accumulator module relating to the first embodiment of the present invention.

In the first embodiment, the flat tube 151 of the internal heat exchanger 150 is spirally wound. However, in this embodiment, as shown in FIG. 9, when plates 157, which have been formed into a predetermined profile by means of press forming, are laminated in the thickness direction, the high pressure side refrigerant passage 158 in which the high pressure side refrigerant circulates and the low pressure side refrigerant passage 159 in which the low pressure side refrigerant circulates are alternately formed in the laminating direction. In this connection, reference numeral 157a is a protruding fin, which is formed by raising a portion of the plate 157, to increase the heat transfer area.

Figure 10:
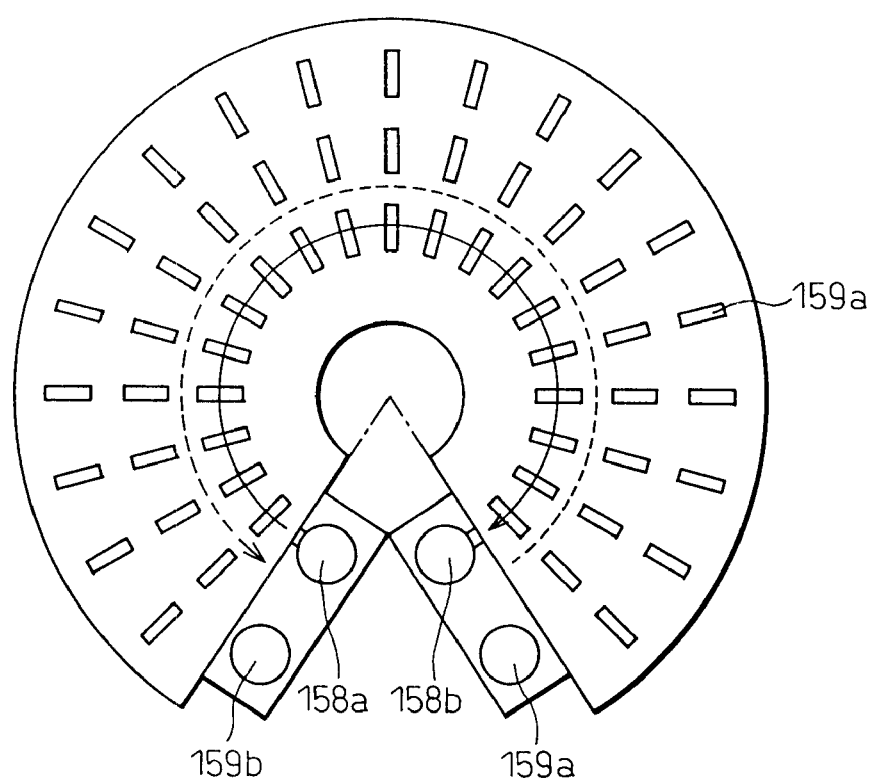
FIG. 10 is a front view of an internal heat exchanger used for the accumulator module relating to the first embodiment of the present invention.

In this case, as shown in FIG. 10, when it is viewed in the laminating direction, the direction (arrow of a solid line shown in FIG. 10) of a current of the high pressure side refrigerant and the direction (arrow of a broken line shown in FIG. 10) of a current of the low pressure side refrigerant are opposite to each other, so that the current of the high pressure side refrigerant and the current of the low pressure side refrigerant can form a counter-flow.

In this connection, reference numerals 158a, 158b, 159a, 159b are header pipes extending in the laminating direction of the plates 157 and communicating with the refrigerant passages 158, 159. The header pipe 158a is communicated with a plurality of high pressure side refrigerant passages 158 so as to supply the refrigerant to each high pressure side refrigerant passage 158, and the header pipe 158b is communicated with a plurality of high pressure side refrigerant passages 158 so as to collect the refrigerant flowing out from each high pressure side refrigerant passage 158.

The header pipe 159a is communicated with a plurality of low pressure side refrigerant passages 159 so as to supply the refrigerant to each low pressure side refrigerant passage 159, and the header pipe 159b is communicated with a plurality of low pressure side refrigerant passages 159 so as to collect the refrigerant flowing out from each low pressure side refrigerant passage 159.

In the above embodiment, the accumulator module of the present invention is applied to an air conditioner (heat pump type refrigerating machine) capable of being changed over between cooling operation and heating operation, however, it should be noted that the present invention is not limited to the above specific embodiment. It is possible to apply the present invention to another vapour-compression type refrigerating machine such as an air conditioner exclusively used for cooling operation, an air conditioner exclusively used for heating operation, or a hot-water supply device in which heat pump operation is conducted.

In the refrigerating machine of the above embodiment, carbon dioxide is used as refrigerant, however, it should be noted that the present invention is not limited to the above specific embodiment. For example, ethylene, ethane or nitrogen oxide may be used as refrigerant.

In the above embodiment, the pressure of refrigerant of carbon dioxide on the high pressure side is not lower than the critical pressure of refrigerant. However, it should be noted that the present invention is not limited to the above specific embodiment. It is possible to apply the present invention to a refrigerating machine in which chlorofluorocarbon is used as refrigerant and pressure of refrigerant on the high pressure side is lower than the critical pressure of refrigerant.

In the above embodiment, the present invention is applied to a vehicle having a fuel cell to drive the vehicle, however, it should be noted that the present invention is not limited to the above specific embodiment. It is possible to apply the present invention to a vehicle having only an internal combustion engine to drive the vehicle. Also, it is possible to apply the present invention to a hybrid vehicle in which an electric motor and internal combustion engine are combined with each other so as to drive the vehicle.

While the invention has been described by reference to specific embodiments chosen for purposes of illustration, it should be apparent that numerous modification could be made thereto by those skilled in the art without departing from the basic concept and scope of the invention.

What is claimed is:

1. An accumulator module applied to a vapour-compression type refrigerating machine in which decompressed refrigerant is evaporated so as to absorb heat and the thus evaporated refrigerant is sucked into and compressed by a compressor (110), comprising:

an accumulator (140) for separating refrigerant into gas-phase refrigerant and liquid-phase refrigerant and storing redundant refrigerant therein, the thus separated gas-phase refrigerant flowing out from the accumulator (140) onto the suction side of the compressor (110);

a pressure reducing device (161a) for decompressing the refrigerant on the high pressure side which is compressed by the compressor (110) and cooled after that, said pressure reducing device being integral with said accumulator; and an internal heat exchanger (150) for conducting heat exchange on the refrigerant on the low pressure side which is decompressed by the pressure reducing device (161a), before it is sucked into the compressor (110), wherein the pressure reducing device (161a) is fixed to the accumulator (140), and the internal heat exchanger (150) is housed in the accumulator (140).

2. An accumulator module according to claim 1, wherein a cover (141) to close an upper end side of the accumulator (140) includes a refrigerant passage (145) to communicate the pressure reducing device (161a) on the internal heat exchanger side with the internal heat exchanger (150).

3. An accumulator module according to claim 2, wherein a total sum of the cross section of a gap formed between the accumulator (140) and the internal heat exchanger (150) is not smaller than an area of an opening of a refrigerant inlet (142a).

4. An accumulator module according to claim 1, wherein the pressure reducing device (161a) is fixed to an upper end side of the accumulator (140) formed into a cylindrical shape, the pressure reducing device (161a) includes a refrigerant port (435, 436) on the internal heat exchanger side communicated with the internal heat exchanger (150) and a refrigerant port (431, 433) into which the refrigerant before or after being decompressed by the pressure reducing device (161a) flows, the refrigerant port (435, 436) on the internal heat exchanger side is located on an upper end side of the accumulator (140) and open to the inside of the accumulator (140), and the refrigerant port (431, 433) is open in a direction substantially perpendicular to a longitudinal direction of the accumulator (140).

5. An accumulator module according to claim 1, wherein a first opening section (154) into which the low pressure side refrigerant flows and a second opening section (156) from which the low pressure side refrigerant flows out, are formed on an upper face of the accumulator (140) under the condition that the pressure reducing device (161a) is attached to an upper portion of the accumulator (140).

6. An accumulator module according to claim 1, wherein the pressure reducing device is fixed to an upper end side of the accumulator formed into a cylindrical shape.

7. An accumulator module according to claim 1, wherein the internal exchanger is positioned at an upper portion of the accumulator and is provided at the upper portion of a refrigerant discharge tube through which the gas-phase refrigerant flows out to a suction side of the compressor.

* * * * *